(12) United States Patent
Folkers

(10) Patent No.: US 7,500,489 B2
(45) Date of Patent: Mar. 10, 2009

(54) CONTAINED PIPELINE SYSTEM WITH BRINE FILLED INTERSTITIAL SPACE AND METHOD FOR DETECTING LEAKAGE IN SAME

(75) Inventor: Joie L. Folkers, Houston, TX (US)

(73) Assignee: Ameron International Corporation, Pasadena, CA (US)

( * ) Notice: Subject to any disclaimer, the term of this patent is extended or adjusted under 35 U.S.C. 154(b) by 0 days.

(21) Appl. No.: 11/136,737

(22) Filed: May 20, 2005

(65) Prior Publication Data

US 2005/0257833 A1 Nov. 24, 2005

Related U.S. Application Data

(63) Continuation-in-part of application No. 10/641,808, filed on Aug. 15, 2003, now Pat. No. 7,011,102.

(60) Provisional application No. 60/405,377, filed on Aug. 23, 2002.

(51) Int. Cl.
*F16K 37/00* (2006.01)

(52) U.S. Cl. .................... 137/312; 137/15.11; 137/558; 138/114; 73/40

(58) Field of Classification Search .................. 138/113, 138/114; 73/49.5, 40.5, 94.4, 40.7, 46, 49.1, 73/40; 137/15.11, 312, 558; 340/605, 622
See application file for complete search history.

(56) References Cited

U.S. PATENT DOCUMENTS

| | | | | |
|---|---|---|---|---|
| 4,561,292 A | * | 12/1985 | Pugnale et al. | 73/49.2 |
| 4,696,186 A | * | 9/1987 | Sharp | 73/49.2 |
| 4,798,496 A | * | 1/1989 | Sawada | 73/49.2 |
| H594 H | * | 3/1989 | Adorjan | 138/148 |
| 4,848,456 A | | 7/1989 | Kilbarger | |
| 4,932,257 A | * | 6/1990 | Webb | 73/40.5 R |
| 4,936,705 A | * | 6/1990 | Schneider | 73/49.2 |
| 4,939,833 A | | 7/1990 | Thomas | |
| 5,096,087 A | | 3/1992 | Thomas | |
| 5,172,584 A | | 12/1992 | Thomas | |
| 5,263,794 A | * | 11/1993 | Webb | 405/52 |
| 5,265,465 A | | 11/1993 | Thomas | |
| 5,271,518 A | | 12/1993 | Webb | |
| 5,297,896 A | * | 3/1994 | Webb | 405/52 |
| 5,343,738 A | * | 9/1994 | Skaggs | 73/40.5 R |
| 5,346,625 A | | 9/1994 | Webb | |
| 5,366,318 A | | 11/1994 | Brancher | |
| 5,398,976 A | | 3/1995 | Webb | |
| 5,494,374 A | * | 2/1996 | Youngs et al. | 405/52 |
| 5,589,631 A | * | 12/1996 | Spring et al. | 73/49.2 |
| 5,911,155 A | * | 6/1999 | Webb | 73/40.5 R |

(Continued)

*Primary Examiner*—John Rivell
*Assistant Examiner*—Cloud K Lee
(74) *Attorney, Agent, or Firm*—Christie, Parker & Hale, LLP.

(57) ABSTRACT

A contained pipeline and leak detection system includes a primary pipeline section surrounded by a secondary pipeline section and an interstitial space formed between the primary pipeline section and the secondary pipeline section. A pressurized fluid reservoir having a volume of fluid, and in fluid communication with the interstitial space is provided. The fluid in the interstitial space has a pressure greater than the pressure of a fluid inside the primary pipeline section. A sensor detects changes in the volume of fluid in the fluid reservoir, which are indicative of leakage or system malfunction.

43 Claims, 8 Drawing Sheets

U.S. PATENT DOCUMENTS

| | | |
|---|---|---|
| 5,992,217 A | 11/1999 | Jax et al. |
| 6,016,697 A * | 1/2000 | McCulloch et al. ....... 73/304 C |
| 6,026,862 A | 2/2000 | Friedrich et al. |
| 6,029,505 A * | 2/2000 | Webb ...................... 73/40.5 R |
| 6,032,699 A | 3/2000 | Cochran et al. |
| 6,116,817 A | 9/2000 | Osborne |
| 6,171,025 B1 | 1/2001 | Langner et al. |
| 6,315,497 B1 | 11/2001 | Wittman et al. |
| 6,823,886 B2 * | 11/2004 | Bravo et al. .................. 137/312 |
| 6,935,161 B2 * | 8/2005 | Hutchinson .............. 73/40.5 R |
| 6,974,054 B2 * | 12/2005 | Hutchinson ................. 137/312 |
| 7,051,580 B1 * | 5/2006 | Lewis et al. .................. 73/49.5 |
| 2004/0035464 A1 * | 2/2004 | Folkers ....................... 137/312 |
| 2004/0045343 A1 * | 3/2004 | Hutchinson .............. 73/40.5 R |
| 2004/0234338 A1 | 11/2004 | Monroe et al. |

\* cited by examiner

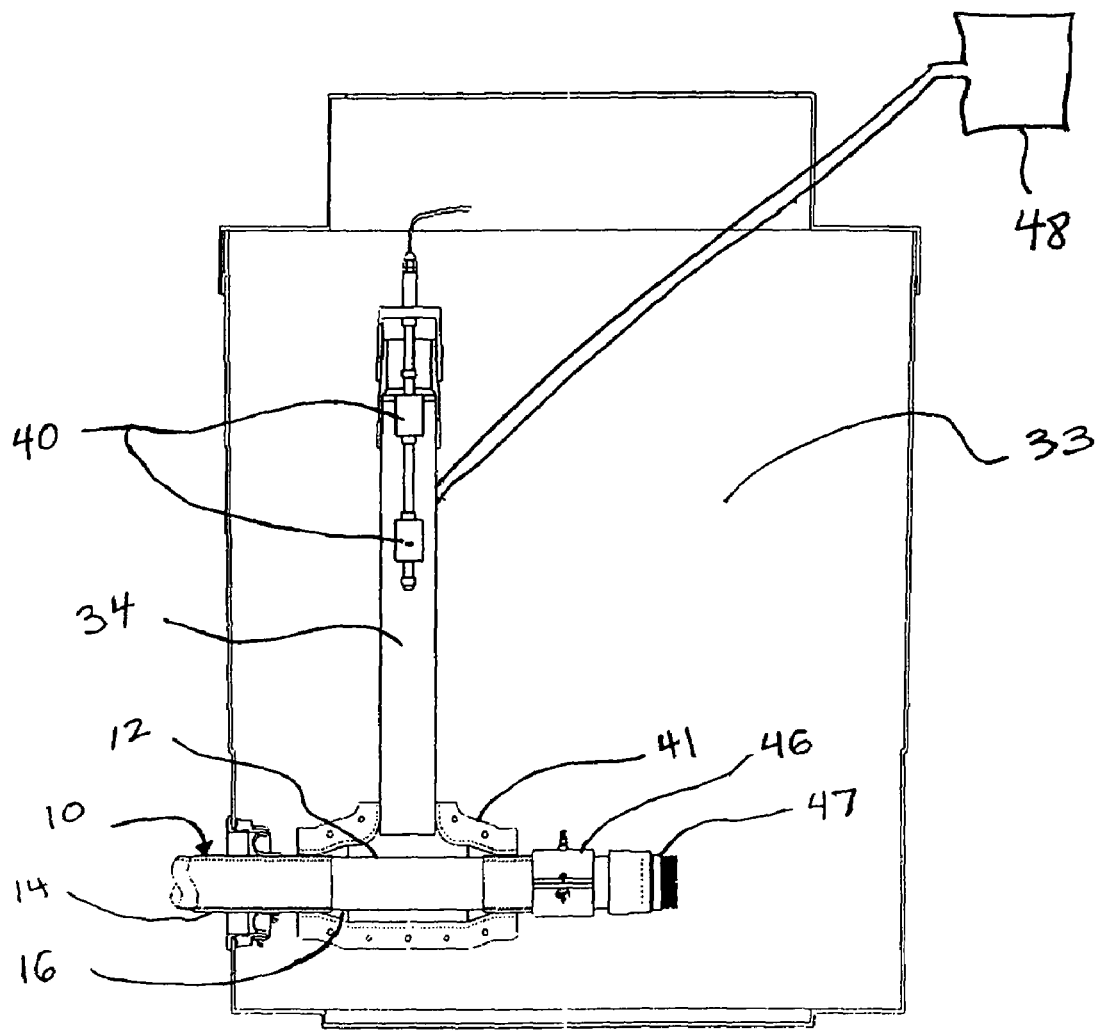

CONTAINED PIPELINE SYSTEM WITH BRINE FILLED INTERSTITIAL SPACE AND METHOD FOR DETECTING LEAKAGE IN SAME

CROSS-REFERENCE TO RELATED APPLICATION(S)

This application is a continuation-in-part application of U.S. patent application Ser. No. 10/641,808, filed on Aug. 15, 2003, now U.S. Pat. No. 7,011,102 which claims the benefit of U.S. Provisional Patent Application No. 60/405,377, filed on Aug. 23, 2002.

FIELD OF THE INVENTION

This invention relates to a contained pipeline system and, more particularly, to a contained pipeline system with a brine filled interstitial space characterized by a low annular volume for use with a continuous leak detection monitoring system, and a method of detecting leakage in such system. Moreover, the system is capable of being pressurized.

BACKGROUND OF THE INVENTION

Double containment pipelines are in common use for transporting contaminants and toxins underground. They are commonly used as underground gasoline transporting pipelines. A double containment pipeline section is in essence a pipeline section within a pipeline section. An inner or primary pipeline section is the primary carrier of the fluids while the outer or secondary pipeline section is used to contain any leakage from the primary pipeline section. An annulus or interstitial space is formed between the primary and secondary pipeline sections. Typically, double containment pipeline sections are formed by slipping a secondary pipeline section over the primary pipeline section. The secondary pipeline section is typically the next largest size after the primary pipeline section.

Slipping one pipeline section over the other is a cumbersome, time consuming process because the primary pipeline section is formed separately from the secondary pipeline section and then the two are put together. Moreover, this approach is not conducive to forming double containment pipeline sections having curvatures such as double containment fittings. Sometimes the primary pipeline section is impact damaged before or during the process of being slipped into the secondary pipeline section. If the primary pipeline section is made from a composite material, such damage may not be capable of being detected by the human eye. As a result, double containment pipeline sections formed using this method may be undetectably damaged from the onset.

To detect leakage of the primary pipeline section, a sump is generally placed at the lowest point of the pipeline. The sump is typically connected to a lower portion of the annulus formed between the primary and secondary pipeline sections. Any fluid leaked from the primary pipeline section will travel in the annulus and will collect in the sump. The sump is periodically monitored to determine if there has been leakage. A sensor may be placed in the sump for detecting the accumulation of fluids. A disadvantage with this leak monitoring approach is that it is not instantaneous, i.e., a leak from the primary pipeline section that is located far enough upstream from the sump would not be detected until the leaked fluid has traveled down the pipeline and into the sump.

During installation and initial inspection of double containment pipeline sections, leakage may be detected by visual inspection of the primary pipeline section. To accomplish this type of inspection, the secondary pipeline section is telescoped away from the primary pipeline section. This is also a time consuming, costly process.

Furthermore, the use of a continuous leak detection monitoring system that places a fluid, such as brine, in the annulus (or interstitial space) has been impractical and costly for double containment pipeline. In such monitoring systems, the interstitial space is filled with a fluid substance, such as brine, and connected to a fluid reservoir where the brine levels are monitored. This allows for continuous monitoring of leaks in both the primary and secondary pipeline sections because a leak in either would change the volume of fluid in the interstitial space and, thus, the fluid reservoir. The use of fluid for continuous monitoring has been practical in double-walled tanks, but not in pipeline systems. Unlike underground storage tanks that are assembled in factories, double containment pipeline systems must be assembled in the field, which makes filling the interstitial space with fluid difficult. Additionally, known double containment pipeline sections having one pipeline section mounted over another pipeline section typically have a large interstitial space, which requires large volumes of fluid.

Another type of contained pipeline system that has been used for conveying fuel from tanks to dispensers is extruded, flexible hosing. Typically, in such contained systems the flexible hosing has a "coaxial" construction, wherein the primary layer and secondary layer are in close proximity. Although the coaxial construction lowers the volume of the interstitial space and the amount of brine required to fill the interstitial space, the material properties of flexible hoses are not stiff enough to resist the significant changes in volume that occur in the primary hose when it is under internal pressure (i.e. the diameter expands). This change in volume is a reason why a continuous monitoring leak detection system has been practical for underground storage tanks, but not for flexible hosing.

Underground storage tanks are typically filled with fuel and remain at atmospheric pressure. Therefore, no pressure differential exists between the tank interior and the interstitial space between the walls. In contrast, pipeline used for dispensing or transporting fuel from the underground storage tanks are typically operated with internal pressure on the interior pipeline section. The internal pressure changes, for example, when a submersible turbine pump (STP) located at the tank is turned on by a consumer at a fuel dispenser and when a nozzle at the dispenser is turned off when a full tank of gas is detected. The pressure change at the starting of the pump is typically approximately 30 psi, and the spike in pressure at the nozzle shut-off can be over 200 psi. Thus, the fuel dispensing pipeline sections must be able to withstand tremendous pressure. With respect to the flexible hosing, the primary layer cannot sufficiently withstand the high pressure changes without expanding under pressure, thus affecting the volume of the interstitial space. Therefore, although the coaxial construction of the flexible hosing has a low volume interstitial space, continuous monitoring of the interstitial space has been impractical and unreliable.

Furthermore, attempts to use continuous monitoring in double containment pipeline sections or coaxial flexible hoses have only been able to monitor the pipeline sections themselves and not the fittings that connect the pipeline sections. Rather, in such systems, where the pipeline sections are joined together by a fitting (which includes elbows, tees, etc.), the interstitial spaces of the two pipeline sections are not continuously joined and are not in fluid communication with each other. Instead, the fittings only maintain a continuous connection between the primary pipeline sections, and the interstitial spaces of the two pipeline sections are separately connected by some form of bypass hose, jumper device, or boot device. Therefore, known systems fail to maintain a continuous leak detection system for the entire system, including at the fittings.

Accordingly, there exists a need for a contained pipeline system with a double containment pipeline section having a coaxial construction that exhibits high strength and has a low volume interstitial space. Moreover, there exists a need for a system where the fittings that connect the various pipeline sections maintain a continuous connection between the primary pipeline sections and the secondary pipeline sections. Use of such pipeline sections and pipeline fittings would allow for a contained pipeline system where brine could be filled in the interstitial space to provide a continuous leak detection monitoring system of both the primary and secondary pipeline sections, as well as at the pipeline fittings.

Furthermore, regulations in force in Europe, and for which adoption is being considered in the State of California, require the interstitial space in product piping to be pressurized to at least one atmosphere above the pressure the pressure in the primary pipeline. Additionally, Underwriters Laboratories Inc. requires a containment system that is closed (i.e., capable of being pressurized) to be rated, according to their rating method, to a minimum of 50 psi. Consequently, there exists a need for a system that can be pressurized and meet these requirements.

SUMMARY OF THE INVENTION

An exemplary contained pipeline and leak detection system includes a primary pipeline section substantially surrounded by a secondary pipeline section and an interstitial space formed between the primary pipeline section and the secondary pipeline section. There is a pressurized fluid reservoir having a volume of fluid, and the interstitial space is filled with the fluid such that fluid entering or exiting the interstitial space changes the volume of fluid in the fluid reservoir. There is a sensor for detecting changes in the volume of fluid in the fluid reservoir. The fluid in the interstitial space has a pressure greater than the pressure of a fluid inside the primary pipeline section.

BRIEF DESCRIPTION OF THE DRAWINGS

FIG. 4b is a perspective side view of the contained pipeline system of FIG. 4a.

FIG. 4c is a perspective rear view of the contained pipeline system of FIG. 4a.

FIG. 6 is a partial cross-sectional view of a fluid reservoir mounted within a containment sump.

DETAILED DESCRIPTION OF THE INVENTION

Figure 1:
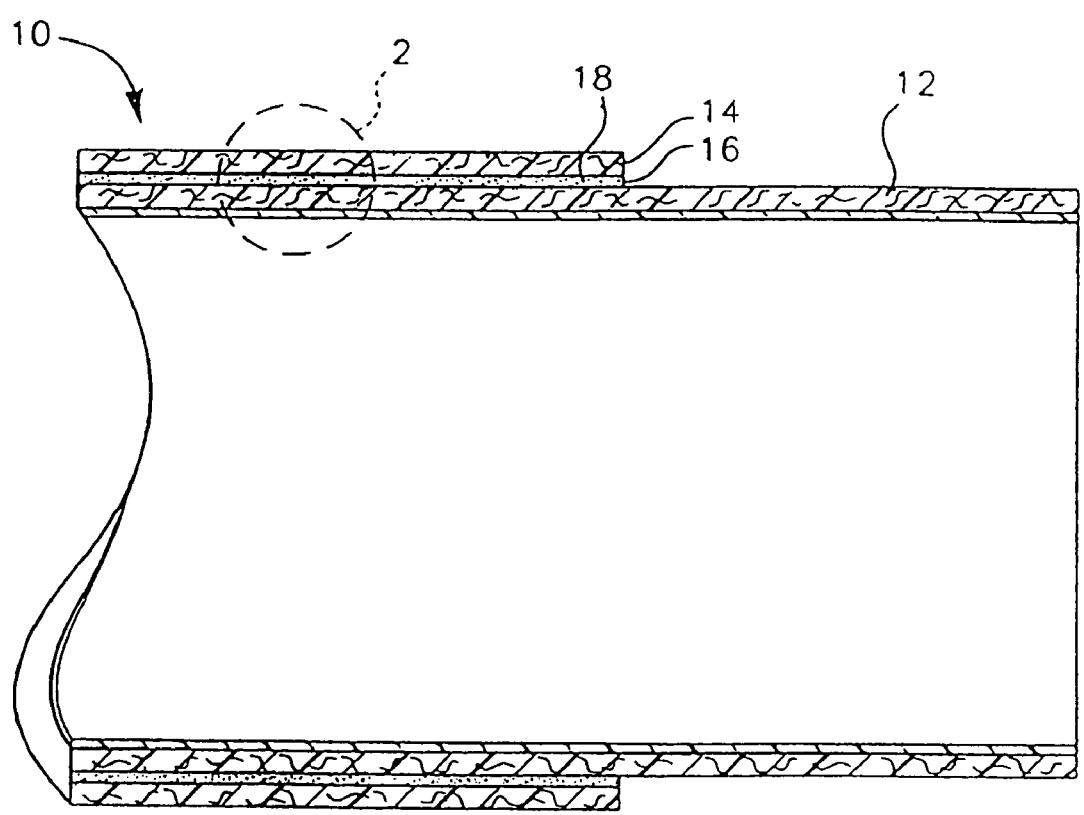
FIG. 1 is a cross sectional view of a double containment pipeline section having sand defining the interstitial space between the primary and secondary pipeline sections.

A contained pipeline system according to the present invention, generally includes a plurality of double containment pipeline sections, with each pipeline section having a primary (inner) pipeline section that is in close proximity and within a secondary (outer) pipeline section, such that an annulus or interstitial space is formed therebetween and has a low interstitial volume. The contained pipeline sections preferably have a coaxial construction, however, it is understood that contained pipeline sections not having a coaxial construction may also be used, including those constructed by disposing a larger pipeline section over a smaller pipeline section (e.g., a 3-inch pipeline section over a 2-inch pipeline section).

The interstitial space is filled with a suitable fluid substance, such as brine or glycol. An exemplary double containment pipeline system includes several pipeline sections joined together by pipeline fittings (i.e., elbows, tees, clamshells, and the like) and connected to one or more fluid reservoirs, which allows the fluid levels within the interstitial spaces of the pipeline sections and within the pipeline fittings to be continuously and instantaneously monitored.

The contained pipeline system can generally be either non-pressurized (i.e., open) or pressurized (i.e., closed). The overall structures of both the non-pressurized and pressurized systems are substantially similar, and most aspects of both systems will be understood to be interchangeable or applicable to both systems, unless specifically stated otherwise. In an non-pressurized system, no additional pressure is created or added to the interstitial space, and in a pressurized system the fluid in the fluid reservoir and the interstitial space is pressurized to a pressure greater than the pressure within the primary pipeline section. In other words, in an non-pressurized system, the fluid reservoir(s) connected to the interstitial spaces of the double containment pipe are not pressurized, and in a pressurized system the fluid reservoir(s) are pressurized.

In a non-pressurized system, if the primary pipeline section leaks, then the fluid levels within the interstitial space and fluid reservoir are increased because fluid inside the primary pipeline section enters the interstitial space. Likewise, if the secondary pipeline section leaks, then the fluid levels within the fluid reservoir are decreased because the fluid inside the interstitial space is entering the environment through the secondary pipeline (i.e., exiting the pipeline system).

In a pressurized system, on the other hand, a leak in either the primary pipeline section or the secondary pipeline section results in a decrease in the fluid level in the fluid reservoir. With a leak in the primary pipeline section, the fluid in the interstitial space enters the primary pipeline section because the interstitial space has a pressure greater than the primary pipeline section, which causes the fluid levels within the fluid reservoir to decrease. If the secondary pipeline section leaks, then the fluid in the interstitial space exits the pipeline system through the secondary pipeline, which causes the fluid level in the fluid reservoir to decrease.

In both the non-pressurized and the pressurized systems, the volume of fluid in the interstitial space remains generally constant. When there is a leak in the primary pipeline or the secondary pipeline the fluid entering or exiting the interstitial space as a result of the leak causes the volume of the fluid in the fluid reservoir to change.

In an exemplary embodiment, the double containment pipeline system of this invention comprises a plurality of pipeline sections 10. An exemplary double containment pipeline section is disclosed in U.S. Pat. No. 6,026,862 to Friedrich et al. entitled "Double Containment Pipe Sections," which is incorporated herein by reference in its entirety. FIG. 1 shows an exemplary double containment pipeline section 10, which comprises a primary pipeline section 12 within a secondary pipeline section 14.

Figure 3:
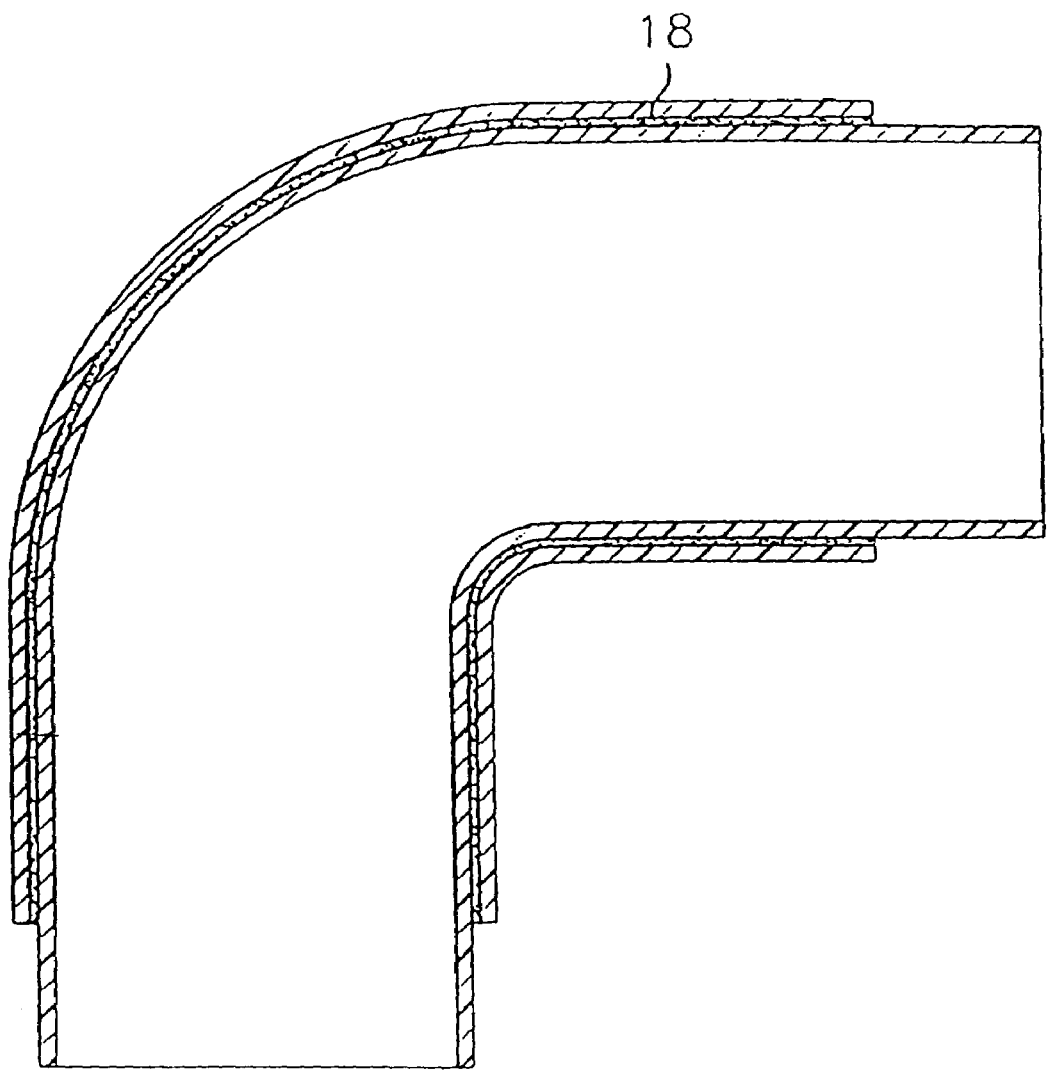
FIG. 3 is a cross sectional view of a double containment pipeline fitting.

The purpose of the secondary pipeline section 14 is to contain any leakage from the primary pipeline section 10, and to assist in the detection of such leakage. The description of the pipeline sections 10 are intended to apply to various configurations of pipeline sections, as well as various fittings used to interconnect pipeline sections. For example, an elbow is shown in FIG. 3 having the same general construction as the pipeline section in FIG. 1. The pipeline fittings that directly connect two or more pipeline sections are often referred to as primary fittings, which include elbows and tees. Other pipeline fittings that may not directly connect the primary pipeline sections, but do connect the secondary pipeline sections, or at least provide containment around the connections achieved by the primary fittings, are often referred to as containment fittings. An exemplary containment fitting is a clamshell fitting (shown in FIG. 5 and discussed below), which has a pair of clamshell halves that are placed over pipeline fittings and/or the pipeline sections being connected by the fittings.

An annulus or interstitial space 16 is formed between the primary pipeline section 12 and the secondary pipeline section 14. In an exemplary embodiment, the radial thickness of the interstitial space (i.e. the distance between the outer surface of the primary pipeline section and the inner surface of the secondary pipeline section) is not greater than about one millimeter. The interstitial space can contain a permeable layer 18 that can be formed from a granular material such as sand, or from any other suitable material such as glass beads. The granular material such as sand serves as a spacer between the primary pipeline section and secondary pipeline section, and defines the interstitial space. Since the granular material forms the permeable layer, it allows for the placement and flow of a fluid substance, such as brine or glycol, for use in a continuous leak detection monitoring system. Furthermore, the permeability of the interstitial space allows for flow of any leaks from the primary pipeline section, and requires less fluid to fill the interstitial space.

Figure 2:
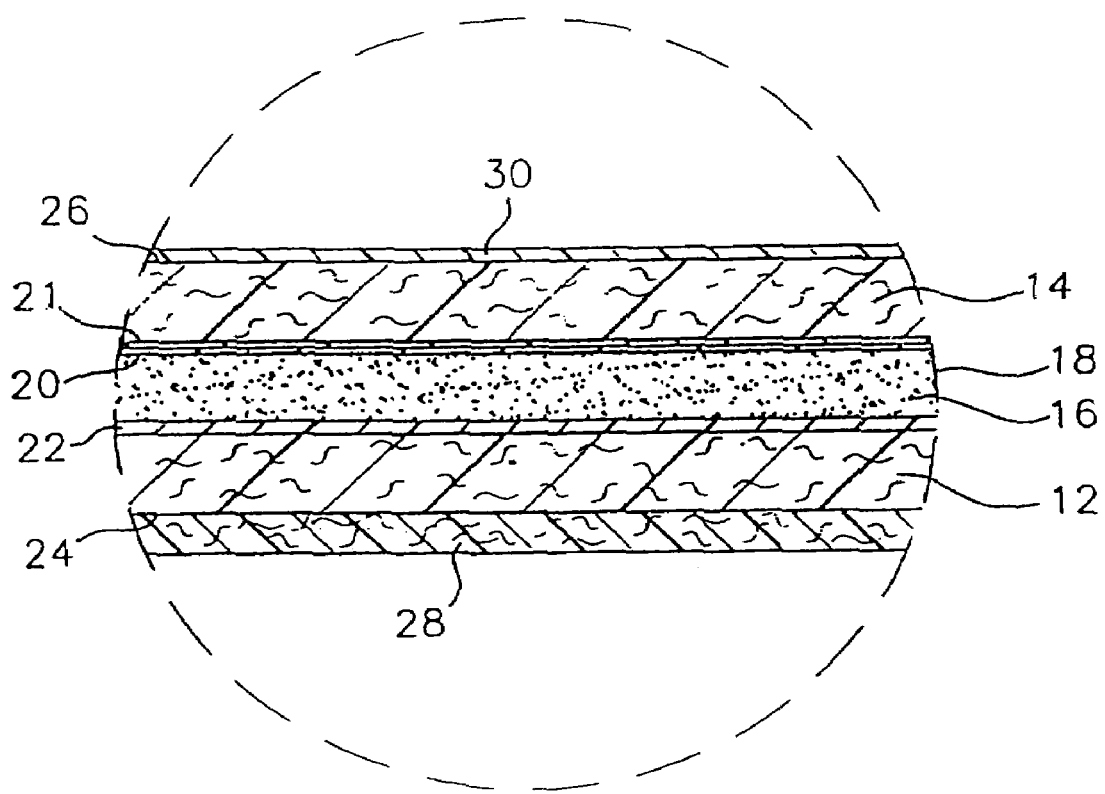
FIG. 2 is an expanded cross sectional view of a section of the double containment pipeline section shown in FIG. 1.

To form the exemplary pipeline sections 10 in an exemplary embodiment, a primary pipeline section 12 is wrapped with a plastic tape 20 having a permeable layer 18 of sand adhered on one of its faces (FIG. 2). Other suitable materials can be used to form the permeable layer, including but not limited to glass beads, which can have a generally spherical shape and a generally consistent size. The tape can be made from polyvinyl fluoride "PVF", polyethylene "PE", polypropylene "PP" or any other suitable material. The tape has a tacky adhesive on one of its faces. A layer of sand can be applied on the face of the tape having the adhesive, by pulling the tape through a container of sand. The tape is then wrapped around the primary pipeline section such that the sand is sandwiched between the outer surface of the primary pipeline section and the plastic tape on to which it is adhered, thereby defining the permeable layer.

A second tape layer 21 is then wrapped around the taped primary pipeline section. The secondary pipeline section is then wound over the taped primary pipeline section. This can be accomplished by winding layers of glass fibers embedded in resin, such as epoxy, over the taped primary pipeline section. The second plastic tape layer prevents the permeation of the resin into the interstitial space occupied by the layer of sand. Such permeation would result in blockage of the interstitial space. The second plastic layer also prevents air from getting into the secondary pipeline section during curing. The wound secondary pipeline section is then cured forming the double containment pipeline section.

In a further exemplary embodiment, the first tape layer is wrapped around the primary pipeline section with the sand facing away from the primary pipeline section. A second and possibly a third tape layer are then wrapped over the exposed sand followed by winding of the secondary pipeline section.

While in the exemplary embodiments, the permeable layer 18 is formed by a granular material such as sand, other permeable materials may also be used. For example, a plurality of glass beads can be placed between the primary pipeline and the secondary pipeline. In another exemplary embodiment, instead of using a tape having sand adhered to one of its faces, a mesh material such as a copper mesh or cloth may be used. The mesh used may be woven or non-woven and may be formed from conductive or non-conductive wires or fibers. With these embodiments, the interstitial space 16 of the double containment pipeline section will contain the mesh material. The mesh may be in tape form to allow for wrapping around the primary pipeline section, especially in a continuous manufacturing process. If the primary pipeline section is in a wet condition (i.e., not cured) a plastic tape layer can be wrapped around the primary pipeline section prior to the wrapping of the mesh. Similarly, a plastic tape layer can be wrapped over the mesh prior to the winding of the secondary pipeline section. The plastic tape layers create a seal for preventing resin from penetrating the mesh, and air from the mesh from penetrating the resin. Other methods known in the art may also be used to form the double containment pipeline sections.

The exemplary embodiments described herein can be easily incorporated into current pipeline manufacturing systems that form pipeline sections, such as by winding glass fibers embedded in resin. Similarly, these embodiments may be incorporated in manufacturing systems that manufacture a continuous section of pipeline by laying longitudinal glass fibers embedded in resin which are wrapped with other glass fibers embedded in resin. Incorporation of these embodiments may be accomplished by adding extra steps to these manufacturing systems to wrap the plastic tape layers, with or without sand or mesh, and to wind the secondary pipeline section. Further, many types of resins can be used for forming either the primary or secondary pipeline section, such as epoxy, polyester, vinyl ester, phenolic, or furan. Moreover, an inner surface 24 of the primary pipeline section and an outer surface 26 of the secondary pipeline section may be coated with protective coatings 28, 30 for protection against the environments to which they are exposed.

Figure 4A:
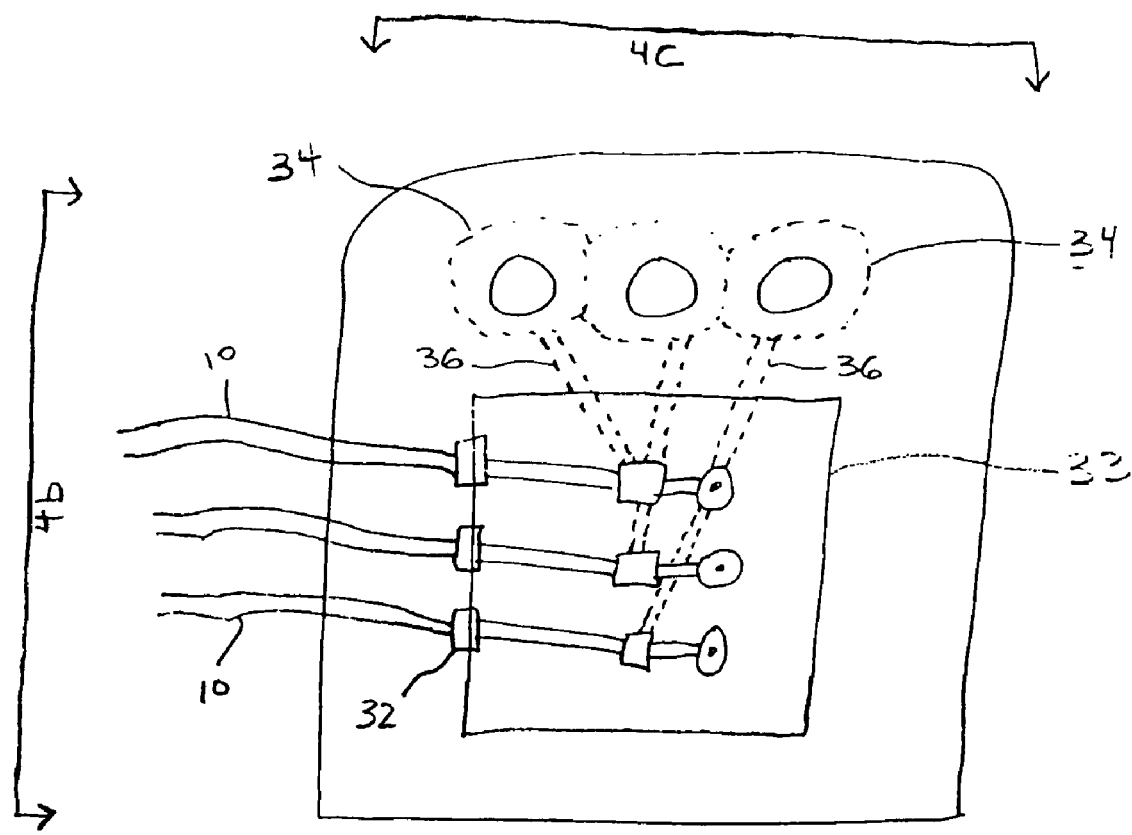
FIG. 4a is a perspective top view of a contained pipeline system having an exemplary continuous leak detection system.
Figure 4B:
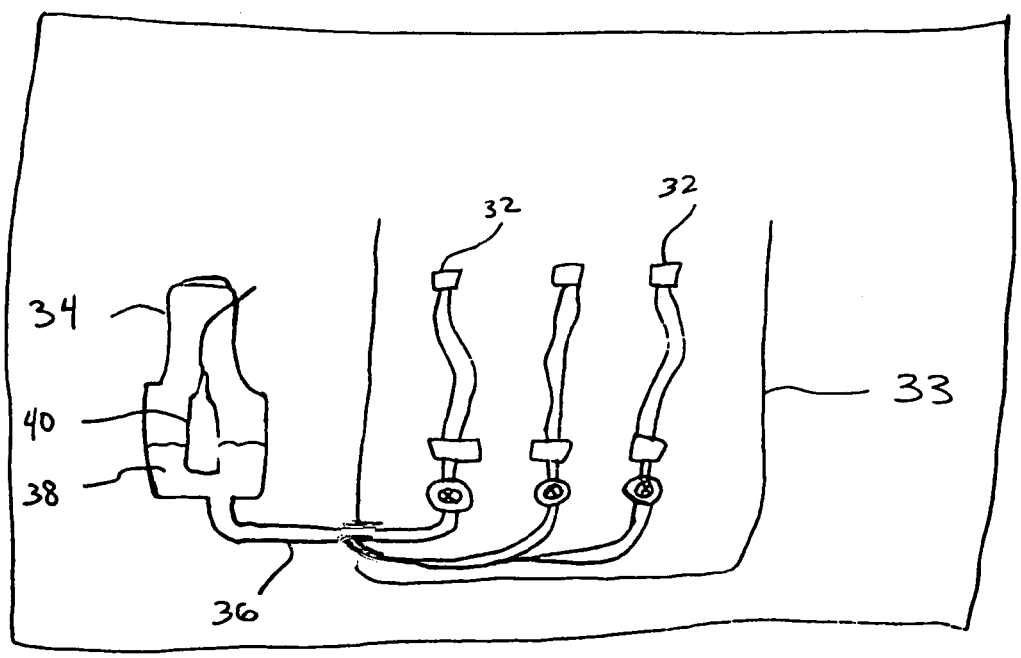
Figure 4C:
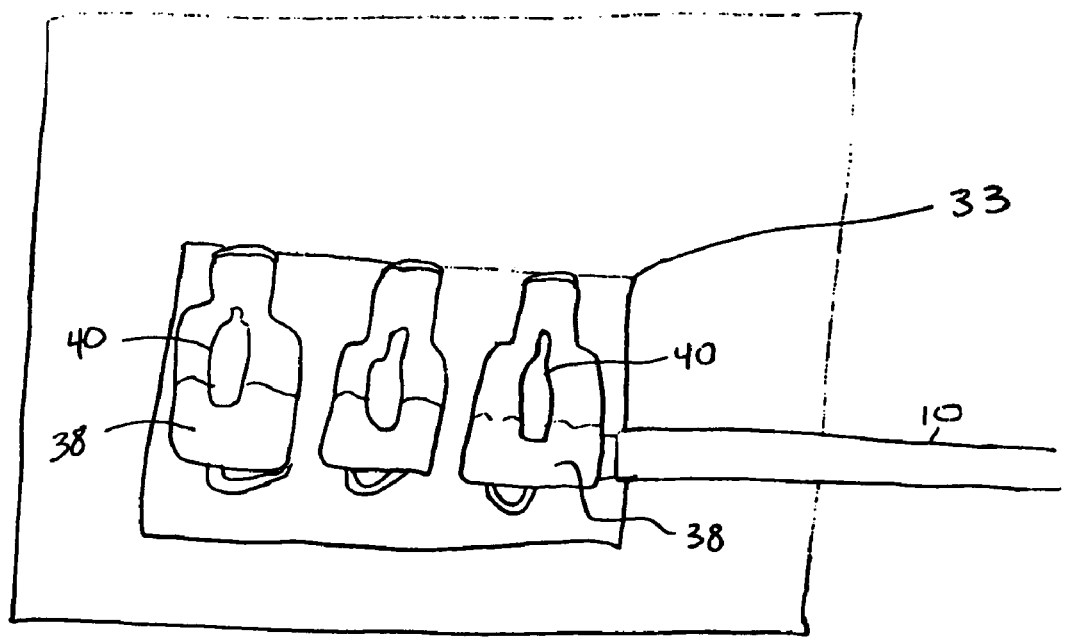

One exemplary configuration of the contained pipeline system having a continuous leak detection monitoring system is shown in FIGS. 4a to 4c. The exemplary system shown can be either a non-pressurized system or a pressurized system, and comprises three pipelines leading to fuel dispensers 32 positioned within a dispenser sump 33, and each of the pipelines leading to fuel dispensers is adjoined to an underground storage tank (not shown) and a fluid reservoir 34. Each of the pipelines leading to fuel dispensers 32 is connected to the underground storage tank by a pipeline section 10, which may include multiple pipeline sections adjoined together by pipeline fittings (not shown). Each of the three pipeline sections 10 is separately adjoined to one of the fluid reservoirs 34 by reservoir hoses 36, which allows a leak in any of the pipeline sections to be individually identified. It is possible, however, to have more than one pipeline section connected to a single fluid reservoir. The reservoir hoses 36 provide fluid communication between the fluid reservoirs 34 and the pipeline sections 10. Moreover, the contained pipeline system can include vapor recovery lines and/or vent lines, which can have the same construction as the primary pipelines and secondary pipelines used to transport fluids such as gasoline, and can be connected to fluid reservoirs to monitor leaks in the same manner.

The fluid reservoirs contain a specified volume of fluid 38, which in the exemplary embodiment is brine. The pipeline sections 10 also have a specified volume of brine 38 disposed within the interstitial space 16 of each of the pipeline sections. The volume of brine disposed within the interstitial spaces of the pipeline sections does not generally change, which allows for reliable leak detection monitoring. The fluid communication between the interstitial space and the fluid reservoir indicates any leaks in the primary or secondary pipeline sections.

In the non-pressurized embodiment of the present system, a leak in the primary pipeline section would cause fluid to enter the interstitial space through the primary pipeline section and to increase the volume of fluid in the fluid reservoir. Similarly, a leak in the secondary pipeline section would cause fluid to exit the interstitial space through the secondary pipeline section and to decrease the volume of fluid in the fluid reservoir; and in some cases, a leak in the secondary pipeline section could allow an outside fluid source, such as ground water, to enter the interstitial space and increase the volume of fluid in the fluid reservoir.

The ability to continuously monitor the entire pipeline system is achieved by using pipeline fittings that adjoin the pipeline sections and maintain a fluid communication between the primary pipeline sections, between the interstitial spaces, and between the secondary pipeline sections. Unlike previous double containment pipeline systems, the present pipeline system allows for continuous monitoring of the entire system, including the pipeline fittings, by not breaking the connection between the interstitial space of adjoining pipeline sections. As described above, previous systems have only used fittings that directly connect the primary pipeline sections, and the interstitial spaces and secondary pipeline sections are indirectly connected by a separate device such as a jumper hose or boot connector. Such systems have the disadvantage of not being able to detect leaks in the pipeline fittings because the interstitial spaces do not run through the pipeline fittings.

Figure 5:
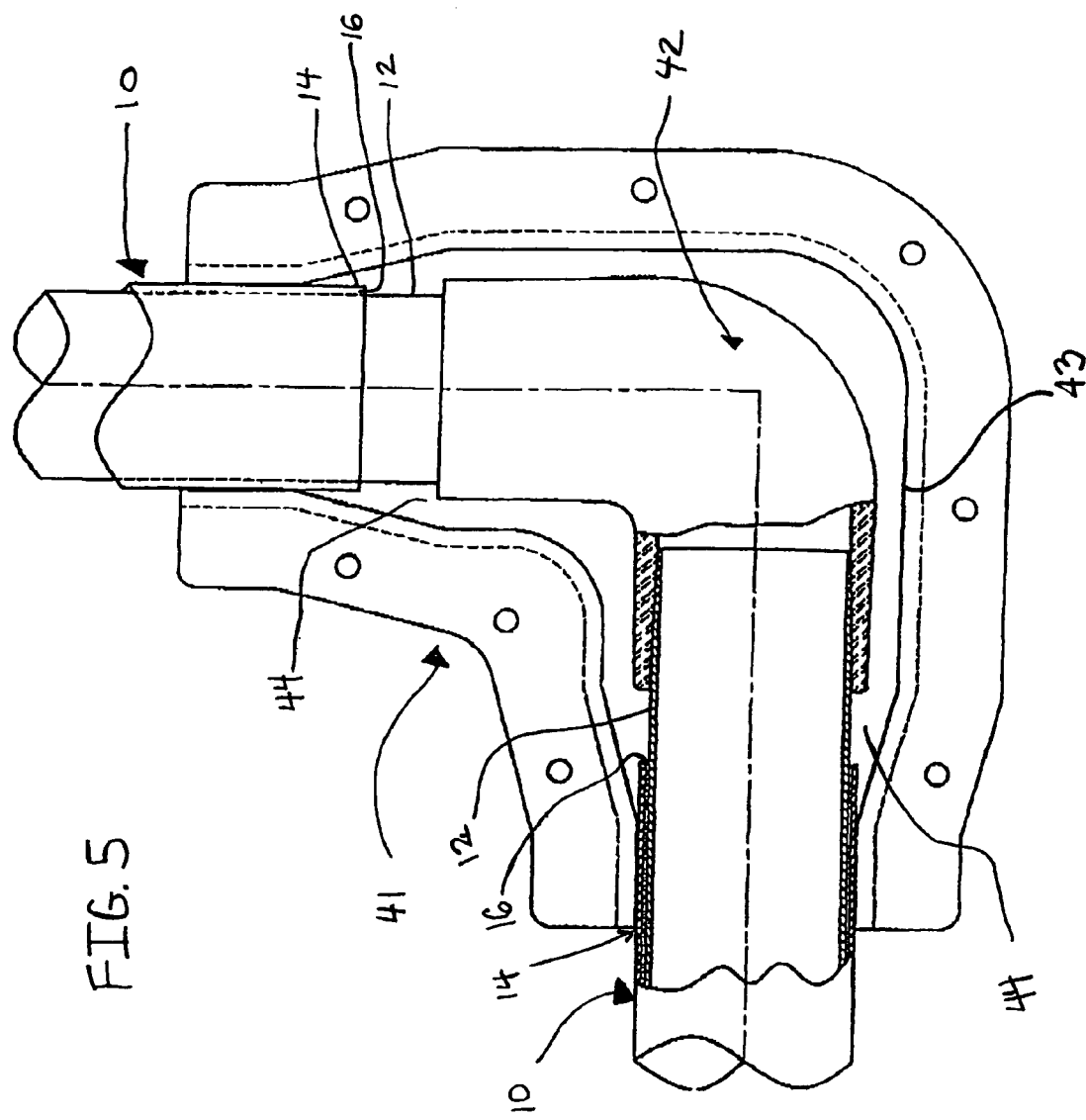
FIG. 5 is a partial cross-sectional view of a pair of pipeline sections adjoined by an elbow and a containment clamshell fitting.

An exemplary pipeline fitting for continuously monitoring the entire pipeline system is shown in FIG. 5, which shows a clamshell fitting 41 being used to adjoin two pipeline sections 10. More specifically, FIG. 5 shows one half of the clamshell fitting 41 disposed around two pipeline sections 10 that are interconnected by an elbow 42. In this configuration, the elbow 42 is the primary fitting that directly joins the primary pipeline sections 12 of the two pipeline sections. The clamshell fitting 41 is the containment fitting that serves to contain the volume of fluid that passes through the interstitial spaces of the two pipeline sections 10, and therefore, also serves as direct connection for the interstitial spaces 16 and the second pipeline sections 14 of the two pipeline sections.

In an exemplary embodiment, each of the pipeline sections 10 shown in FIG. 5 has a portion of the secondary pipeline section 12 cut-back to allow for bonding with the elbow 42. The clamshell fitting 41 envelopes the elbow (i.e., the primary fitting) and directly contacts the secondary pipeline sections. Interior surfaces 43 of the clamshell fitting adjoin to exterior surfaces of the secondary pipeline sections such that an annulus 44 is created between the clamshell fitting and the exterior surface of the primary pipeline section. More specifically, the annulus 44 provides a path for fluid within the interstitial spaces 16 of the pipeline sections to flow through the clamshell fitting and, thus, maintain continuous fluid communication between the interstitial spaces of the adjoined pipeline sections. Consequently, the annulus 44 of the clamshell fitting is in fluid communication with the brine reservoir and a leak can be continuously detected throughout the entire pipeline system, including the fittings and secondary pipeline sections. The clamshell fitting can be made from any suitable material, such as rigid composite materials that are used in fluid transport pipelines.

Referring to FIGS. 4a to 4c, each of the fluid reservoirs 34 is equipped with one or more sensors 40 that monitor changes of volume in the reservoirs and, thus, within the interstitial spaces 16 in the pipeline sections. The sensors can be any suitable type, including magnetic float types. An exemplary system of leak detection includes a two-level alarm system that is activated by the sensors 40.

In the non-pressurized embodiment, a high level alarm caused by a rise in the brine in the fluid reservoir would indicate a breach in the primary pipeline section and that fluid (such as fuel) is entering the interstitial space from the primary pipeline section and, thus, causing the brine level in the fluid reservoir to rise. The high level alarm could also indicate a breach in the secondary pipeline section and that the secondary pipeline section is allowing an exterior substance (such as ground water) to enter into the system (this is a less likely occurrence). A low level alarm caused by a decrease in the brine level in the fluid reservoir would indicate a breach in the secondary pipeline section and that fluid (brine) was leaking from the interstitial space through the secondary pipeline section and, thus, causing the brine level in the fluid reservoir to fall. No alarm would indicate that each component of the system was intact and without leaks. It is understood that a single sensor could be used to detect a rise and/or a fall within the fluid reservoir.

With respect to the embodiment where the system is pressurized, leaks in either the primary pipeline section or the secondary pipeline section would trigger the low level alarm. A leak in the primary pipeline section would cause brine to exit the interstitial space and brine reservoir and enter the primary pipeline section. Similarly, a leak in the secondary pipeline section would cause brine to exit the interstitial space and fluid reservoir, and exit pipeline system (likely into the soil surrounding the pipeline). Thus, the pressurized system could use only a low level alarm. A high level alarm, however, could still be advantageous because it would signal a general system malfunction, such as the controlled pressure being disrupted. For example, filling the interstitial space with brine in a pressurized system requires the brine to be set at a predetermined pressure, such that a certain amount of air will be trapped within the brine and interstitial space. When the brine is pressurized, the volume of trapped air will be reduced due to air compression and the system is in a steady state ready to detect leaks. If the pressurization system failed, however, then the trapped air would re-expand, thereby increasing the volume within the interstitial space and, consequently, increasing the volume within the brine reservoir. Such an increase would trigger the high level alarm.

In alternate exemplary embodiments, a low level alarm may be used in lieu of a high level alarm, and a high level alarm may be used in lieu of a low level alarm. Other types of alarm systems or alarm levels may also be used for differentiating The pressurized system includes a compressed gas that is inserted into the space above the brine level in the brine reservoir and below the inside top surface of the brine reservoir. Affecting and maintaining the pressurization within the brine reservoir, and thus the interstitial space, can be accomplished by any known and suitable means. One exemplary means includes connecting the brine reservoir to pressure source that supplies a regulated compressed gas such as nitrogen. To ensure that an excessive or detrimental amount of pressure does not build-up in the reservoir or interstitial space during operation, the system can include a suitable pressure relief valve. Persons skilled in this area of art understand that several options for affecting and maintaining pressurization exist, as do the options for pressure relief valves or other similar precautionary measures.

In an exemplary pressurized system, the pressure in the brine reservoir and interstitial space is at least one atmosphere greater than the pressure in the primary pipeline section. In one exemplary embodiment, the pressure in the fluid reservoir and interstitial space is at least one atmosphere greater than the pressure in the primary pipeline section, or is 50 psi, whichever is greater.

Because the primary pipeline section and secondary pipeline section preferably form an integral unit with a small interstitial space, the exemplary contained pipeline system, including both the non-pressurized system and the pressurized system, allows for faster leak detection, and makes the use of brine more practical. The volume of brine necessary to fill the interstitial space is significantly reduced by using the above-described double containment pipeline. For example, a 2-inch pipeline section made according to the exemplary pipeline section 10 has an interstitial volume of approximately one gallon per 82 feet of pipeline. Therefore, for a pipeline run of approximately 200 feet, less than 3 gallons of brine would be needed to fill the interstitial space. In comparison, a double containment pipeline constructed by having a 3-inch pipeline section disposed over a 2-inch pipeline section would require approximately 20 gallons of brine for the same length. While it is understood that the present system can include such double containment pipeline sections (i.e. 3-inch over 2-inch), the exemplary pipelines having a coaxial construction require substantially less brine.

Concerning the fluid reservoirs, it is preferred that the reservoirs be located within the dispenser sump. Because the reservoirs do not need to be very large in size, particularly when using double containment pipeline sections with low interstitial volume, it is feasible to place the reservoirs directly into the sump.

An example of the reservoir 34 positioned within the sump 33 is shown in FIG. 6. More specifically, a pipeline section 10 is adjoined to a termination assembly 46 by a clamshell fitting 41. The clamshell fitting connects to the secondary pipeline section 14. A termination fitting 46 is, in the exemplary embodiment, connected to the outer surface of the secondary pipeline section and the outer surface of the primary pipeline section, and thereby terminates the interstitial space and the flow of fluid therein. The primary pipeline section 12 extends past the termination fitting 46 and into a connector fitting 47. The connector fitting adjoins the primary pipeline section to a dispenser (not shown) for dispensing the fluid within the primary pipeline section. In this configuration, the interstitial space 16 between the primary pipeline section and the secondary pipeline section is in fluid communication with the clamshell fitting 41. The clamshell fitting is also connected to a fluid reservoir 34, which has an opening that allows the fluid flowing in the interstitial space of the pipeline section 10 to pass through the clamshell fitting and into the fluid reservoir. The fluid reservoir is also connected to a pressure source 48 that pressurizes the fluid reservoir. The pressure source 48 can be any suitable means for pressurizing the fluid reservoir, including but not limited to supplying a compressed gas such a nitrogen. Moreover, the pressure source is shown positioned outside of the sump 33, but the pressure source can be positioned at any desired location, including within the sump. Thus, the fluid reservoir is pressurized and in fluid communication with the interstitial space of the pipeline section, such that sensors 40 positioned within the fluid reservoir detect changes in the fluid level within the interstitial space, and thus, detect any leaks in the pipeline section(s) or system malfunctions relating to pressurization and the fluid reservoir.

Equipment for constructing the present contained pipeline system is already available. A practical location of the fluid reservoirs and pipeline sections for the system can be determined on a site specific basis.

In an exemplary embodiment, the accuracy of the sensors and fluid reservoirs should not be impacted by pressure and temperature changes experienced by the pipeline sections because the exemplary pipeline sections are constructed to withstand such changes. Several advantages are gained by use of a coaxial pipeline section having a permeable layer (such as sand) between the primary pipeline section and secondary pipeline section. If the primary pipeline section expands under internal pressure, the sand forces the secondary pipeline section to expand the same amount. This dramatically limits the change in volume of the interstitial space, and reduces the number of false alarms that would result from pressure changes in other systems (e.g., flexible hosing).

Also, in most conventional dual containment pipeline systems, the primary pipeline section is loosely positioned inside the secondary pipeline section. Accordingly, pressure and resulting diameter changes in the primary pipeline section do not effect diameter changes in the secondary pipeline section, so larger changes in interstitial volume occur. This significantly increases the size of the reservoir required for the system.

The small reservoir that results from the exemplary pipeline system also has economic advantages because the reservoir can be made small enough to fit inside the existing sump under the dispensers. This eliminates the additional expense in construction and installation (i.e., extra fittings, hoses to connect to the reservoir, extra sumps under the reservoirs, covers, etc.) required with a separate reservoir outside of the sump.

Although the use of brine has been specifically described, it is understood that other types of fluids, such as glycol and the like, can be used depending on the particular application. Brine is suitable because of its resistance to freezing and its chemical inertness to fiberglass pipeline materials.

In addition to the specific features and embodiments described above, it is understood that the present invention includes all equivalents to the structures and features described herein, and is not to be limited to the disclosed embodiments. For example, the size and volume of interstitial space can be varied, as can the general construction of the double containment pipeline sections. Additionally, individuals skilled in the art to which the present contained pipeline system pertains will understand that variations and modifications to the embodiments described can be used beneficially without departing from the scope of the invention.

What is claimed is:

1. A contained pipeline system comprising:
    a primary pipeline section surrounded by a secondary pipeline section;
    a first interstitial space formed between the primary and secondary pipeline sections;
    a fitting coupled to the secondary pipeline section and for coupling to a secondary pipeline section of another contained pipeline section, said fitting surrounding at least a portion of the primary pipeline section, wherein a second interstitial space is defined between the fitting and said at least a portion of the primary pipeline section;

a pressurized fluid reservoir having a volume of pressurized fluid, wherein the first and second interstitial spaces are filled with the fluid and the fluid in the interstitial spaces is maintained at a controlled pressure;

a sensor for detecting changes in the volume of fluid in the fluid reservoir; and wherein the fluid in the interstitial spaces has a pressure greater than the pressure of a fluid inside the primary pipeline section, wherein a leak in any of said primary and secondary pipeline sections and said fitting will cause the volume of fluid in the fluid reservoir to decrease.

2. The pipeline system of claim 1, wherein the first interstitial space has a thickness not exceeding about 1 mm.

3. The pipeline system of claim 1, wherein the fluid is brine.

4. The pipeline system of claim 1, wherein the secondary pipeline section is a 3-inch pipeline section and the primary pipeline section is a 2-inch pipeline section.

5. The pipeline system of claim 1 wherein the pressure of the fluid in the interstitial spaces is at least one atmosphere greater than the fluid in the primary pipeline section.

6. The pipeline system of claim 1 wherein the sensor is a two-level alarm system that provides an alarm at a first level when the volume of fluid in the fluid reservoir has increased to a first predetermined amount, and provides an alarm at a second level when the volume of fluid in the fluid reservoir has decreased to a second predetermined amount.

7. The pipeline system of claim 6 wherein the alarm at the second level indicates a leak in one or more of the primary pipeline section, the secondary pipeline section, and the fitting.

8. The pipeline system of claim 1 wherein the fluid reservoir is pressurized by a gas that is inserted into the fluid reservoir, such that the fluid in the interstitial spaces is maintained at the controlled pressure.

9. The pipeline system of claim 8 wherein the first level alarm indicates that the controlled pressure has been disrupted.

10. The pipeline system of claim 1 wherein a permeable layer of material occupies the first interstitial space and wherein the permeable layer of material is a layer of granular material.

11. The pipeline system of claim 10 wherein the granular material is selected from the group of materials consisting of sand and beads.

12. The pipeline system of claim 1 wherein said pressure of the fluid in the interstitial spaces is maintained at a desired level.

13. A pipeline system comprising:

a first pipeline section having a first secondary pipeline section disposed around a first primary pipeline section, wherein a first interstitial space is formed between the first secondary pipeline section and the first primary pipeline section;

a second pipeline section having a second secondary pipeline section disposed around a second primary pipeline section, wherein a second interstitial space is formed between the second secondary pipeline section and the second primary pipeline section, wherein the first primary pipeline section is coupled to the second primary pipeline section;

a fitting coupling the first pipeline secondary pipeline section to the second pipeline secondary pipeline section and surrounding the coupled primary pipeline sections, wherein a third interstitial space is defined between the coupled primary pipeline sections and the fitting;

a pressurized fluid reservoir having a volume of pressurized fluid, wherein the first, second and third interstitial spaces are filled with the fluid;

a sensor for detecting changes in the volume of fluid in the fluid reservoir; and wherein the fluid reservoir and the first, second and third interstitial spaces are maintained at a controlled pressure greater than the pressure of a fluid inside the first and second primary pipeline sections, wherein a leak in any of said first primary, second primary, first secondary and second secondary pipeline sections, and said coupled primary pipeline sections and said fitting will cause the volume of fluid in the fluid reservoir to decrease.

14. The pipeline system of claim 13, wherein the first and second interstitial spaces have a thickness not exceeding about 1 mm.

15. The pipeline system of claim 13, wherein the fluid is brine.

16. The pipeline system of claim 13, wherein the secondary pipeline sections are 3-inch pipeline sections and the primary pipeline sections are 2-inch pipeline sections.

17. The pipeline system of claim 13 wherein the pressure of the fluid inside the fluid reservoir and the first and second interstitial spaces is at least one atmosphere greater than the pressure of the fluid inside the first and second primary pipeline sections.

18. The pipeline system of claim 13 wherein the sensor is a two-level alarm system that provides an alarm at a first level when the volume of fluid in the fluid reservoir has increased to a first predetermined amount, and provides an alarm at a second level when the volume of fluid in the fluid reservoir has decreased to a second predetermined amount.

19. The pipeline system of claim 18 wherein the alarm at the second level indicates a leak in one or more of the first or second primary pipeline sections, the first or second secondary pipeline sections, or the fitting.

20. The pipeline system of claim 13 wherein the fluid reservoir is pressurized by a gas that is inserted into the fluid reservoir, such that the controlled pressure in the interstitial spaces is maintained at a desired level.

21. The pipeline system of claim 20 wherein the first level alarm indicates that the controlled pressure has been disrupted.

22. The pipeline system of claim 13 wherein a permeable layer of material defines each of the first and the second interstitial spaces.

23. The pipeline system of claim 22 wherein the permeable layer of material is a layer of granular material.

24. The pipeline system of claim 23 wherein the granular material is selected from the group of materials consisting of sand and beads.

25. The pipeline system of claim 13 wherein the pressure pressurizing the first, second and third interstitial spaces is maintained at a desired level.

26. A method of monitoring a contained pipeline system having a primary pipeline section surrounded by a secondary pipeline section defining a first interstitial space between the primary pipeline section and the secondary pipeline section, and having a fitting coupled to the secondary pipeline section and surrounding at least a portion of the primary pipeline section defining a second interstitial space between the fitting and said at least a portion of the primary pipeline section, wherein a fluid reservoir is in communication with the first and second interstitial spaces, the method comprising:

providing a fluid in the fluid reservoir, said fluid entering the interstitial spaces;

pressurizing the fluid in the fluid reservoir and the interstitial spaces to a pressure greater than the pressure of a fluid inside the primary pipeline section; and monitoring changes in the volume of fluid in the fluid reservoir while maintaining the pressure of the fluid in the interstitial spaces at a desired level, wherein a decrease in the volume of fluid in the fluid reservoir is indicative of a leak in any of said primary pipeline section, said secondary pipeline section and said fitting.

27. The method of claim 26 further comprising activating an alarm system when changes in the volume of fluid in the fluid reservoir are detected, wherein changes in the volume are also indicative of a system malfunction.

28. The method of claim 26 wherein the alarm system is a two-level alarm system that provides an alarm at a first level when the volume of fluid in the fluid reservoir has increased to a first predetermined amount, and provides an alarm at a second level when the volume of fluid in the fluid reservoir has decreased to a second predetermined amount.

29. The method of claim 28 wherein the alarm at the second level indicates a leak in one or more of the primary pipeline section, the secondary pipeline section and the fitting.

30. The method of claim 26 wherein the fluid reservoir is pressurized by a gas that is inserted into the fluid reservoir for maintaining said pressure in the interstitial spaces at the desired level.

31. The method of claim 30 wherein the first level alarm indicates that the controlled pressure has been disrupted.

32. The pipeline system of claim 19 wherein a permeable layer of material occupies the first interstitial space and wherein the permeable layer of material is a layer of granular material.

33. The method of claim 32 wherein the granular material is selected from the group of materials consisting of sand and beads.

34. A method of monitoring a contained pipeline system having a first pipeline section and a second pipeline section, each having a secondary portion disposed around a primary portion and defining an interstitial space there-between, wherein the primary portions of the pipeline sections are coupled to each other, and wherein the secondary portions of the pipeline sections are coupled to each other with a fitting, wherein an annulus is defined between the fitting and the coupled primary portions, the method comprising:

providing a fluid reservoir having a volume of fluid;

supplying the fluid from the fluid reservoir into the interstitial spaces and the annulus, wherein the interstitial spaces and the annulus are in fluid communication with the fluid reservoir;

pressurizing the fluid in the fluid reservoir, the interstitial spaces and the annulus to a pressure greater than the pressure of a fluid inside the primary portions;

detecting a leakage in any of the primary portions, wherein the fluid in the interstitial spaces and the annulus is maintained at a controlled pressure, the secondary portions, the coupling of the primary portions, and the fitting by monitoring the volume of fluid in the fluid reservoir, wherein the leakage causes the volume of fluid in the fluid reservoir to change, wherein a decrease in the volume of fluid in the fluid reservoir is indicative of a leak in any of said primary portions and secondary portions of said first and second pipeline sections, the coupling of the primary portions and the fitting.

35. The method of claim 34 further comprising activating an alarm system when changes in the volume of fluid in the fluid reservoir are detected, wherein changes in the volume are also indicative of a system malfunction.

36. The method of claim 34 wherein the fluid reservoir is pressurized by a gas that is inserted into the fluid reservoir in a space that is above the fluid in the fluid reservoir, such that the fluid in the interstitial spaces and the annulus is maintained at the controlled pressure.

37. The method of claim 34 wherein the alarm system is a two-level alarm system that provides an alarm at a first level when the volume of fluid in the fluid reservoir has increased to a first predetermined amount, and provides an alarm at a second level when the volume of fluid in the fluid reservoir has decreased to a second predetermined amount.

38. The method of claim 37 wherein the alarm at the second level indicates a leak in one or more of the primary portions, the secondary portions, or the fitting.

39. The method of claim 37 wherein the first level alarm indicates that the controlled pressure has been disrupted.

40. The method of claim 34 wherein a permeable layer of material defines each interstitial space of the first and of the second pipeline sections.

41. The pipeline system of claim 40 wherein the permeable layer of material is a layer of granular material.

42. The method of claim 41 wherein the granular material is selected from the group of materials consisting of sand and beads.

43. The method of claim 34 wherein during detecting, the pressure of the fluid is maintained at a desired level.

* * * * *

UNITED STATES PATENT AND TRADEMARK OFFICE
CERTIFICATE OF CORRECTION

| | | |
|---|---|---|
| PATENT NO. | : 7,500,489 B2 | Page 1 of 1 |
| APPLICATION NO. | : 11/136737 | |
| DATED | : March 10, 2009 | |
| INVENTOR(S) | : Joie L. Folkers et al. | |

It is certified that error appears in the above-identified patent and that said Letters Patent is hereby corrected as shown below:

In the Amendment

Column 14, line 7      After "portions" Insert -- wherein the fluid in the interstitial spaces and the annulus is maintained at a controlled pressure --

Column 14, line 9-10   Delete "wherein the fluid in the interstitial spaces and the annulus is maintained at a controlled pressure"

Signed and Sealed this

Twelfth Day of October, 2010

David J. Kappos
*Director of the United States Patent and Trademark Office*